United States Patent [19]

Ikedo et al.

[11] Patent Number: 5,646,487
[45] Date of Patent: Jul. 8, 1997

[54] LIGHTING DEVICE FOR GAS DISCHARGE TUBE WITH INSULATED DISCHARGE SHIELDING MEMBER

[75] Inventors: Tomoyuki Ikedo; Yoshinobu Ito; Ryotaro Matui, all of Hamamatsu, Japan

[73] Assignee: Hamamatsu Photonics K.K., Hamamatsu, Japan

[21] Appl. No.: 502,011

[22] Filed: Jul. 13, 1995

[30] Foreign Application Priority Data

Aug. 31, 1994 [JP] Japan .................. 6-207714

[51] Int. Cl.⁶ .................................. H01J 17/02
[52] U.S. Cl. ................... 315/94; 315/107; 315/337; 313/613; 313/623; 313/242; 313/292; 313/580
[58] Field of Search ........................ 313/292, 493, 313/631, 632, 239, 240, 241, 242, 307, 306, 308, 580, 588, 613, 581, 616, 622, 238, 243, 244, 256, 595, 589, 637, 623; 315/94, 107, 337, 339

[56] References Cited

U.S. PATENT DOCUMENTS

| | | | |
|---|---|---|---|
| 2,479,529 | 8/1949 | Watrous, Jr. et al. | 313/592 X |
| 2,813,217 | 11/1957 | Prager et al. | 313/593 |
| 4,149,110 | 4/1979 | Dallos | 315/107 |
| 4,611,143 | 9/1986 | Shimazu et al. | 313/111 |
| 4,910,431 | 3/1990 | Witt et al. | 313/589 |
| 5,047,689 | 9/1991 | Kawai et al. | 315/94 |
| 5,057,742 | 10/1991 | Kawai et al. | 313/623 |
| 5,191,260 | 3/1993 | Kawai et al. | 313/613 |

FOREIGN PATENT DOCUMENTS

| | | |
|---|---|---|
| 60-29400 | 2/1985 | Japan . |
| 4255662 | 9/1992 | Japan . |

*Primary Examiner*—Robert Pascal
*Assistant Examiner*—Arnold Kinkead
*Attorney, Agent, or Firm*—Cushman Darby & Cushman, IP Group of Pillsbury Madison & Sutro, LLP

[57] ABSTRACT

The present invention is to provide a gas discharge tube which is properly lighted to improve the reproducibility of a satisfactory light emission state. The gas discharge tube includes an envelop for accommodating a hot cathode for emitting thermoelectrons, an anode for receiving the thermoelectrons, a focusing electrode having a focusing opening for converging paths of the thermoelectrons, and a discharge shielding member supporting the focusing electrode and the anode, the discharge shielding member further supporting a cathode box for surrounding the hot cathode while being electrically insulated from the focusing electrode. Since a lighting device for the gas discharge tube sets the focusing electrode to a zero or negative potential while an electric field is generated between the hot cathode and the anode, the lighting device will be certainly turned on.

19 Claims, 11 Drawing Sheets

LIGHTING DEVICE FOR GAS DISCHARGE TUBE WITH INSULATED DISCHARGE SHIELDING MEMBER

BACKGROUND OF THE INVENTION

1. Field of the Invention

The present invention relates to a gas discharge tube used as an ultraviolet light source for a spectrophotometer, liquid chromatography, or the like, a lighting device therefor, and a method of operating the lighting device.

2. Related Background Art

A gas discharge tube is a discharge light source using positive column light emission by arc discharge of a gas sealed in a tube. As a typical gas discharge tube, a deuterium discharge tube in which ultraviolet light is emitted by discharge of sealed deuterium is well known. This deuterium discharge tube is mainly used as an ultraviolet continuous spectrum source for a spectrophotometer or the like. Note that a deuterium discharge tube having a light-emitting portion is described in, e.g., Japanese Utility Model Laid-Open No. 60-29400.

SUMMARY OF THE INVENTION

It is an object of the present invention to provide a gas discharge tube which is properly lighted to improve the reproducibility of a satisfactory light emission state. It is another object of the present invention to provide a method of operating a lighting device for a gas discharge tube and a lighting device for a gas discharge tube, which maintain stable discharge and increases a light emission intensity.

In order to achieve the objects, as shown in FIG. 1, a gas discharge tube 10 of the present invention comprises: an glass envelope 11 for sealing a gas therein; lead pins 13 to 16 introduced into an inner space of the envelope 11 from external of the envelope 11; and a light-emitting section 20 in the glass envelope 11, positioned at distal ends of the lead pins 13 to 16 and supported by these lead pins while spaced from an inner side wall of the glass envelope 11. The anode 24 is a metal plate mounted on and supported by the distal end of the lead pin 14.

In particular, as shown in FIGS. 2, 6, and 7, the light-emitting section 20 includes: a discharge shielding member 21 of an insulator, such as a ceramic, having a front surface 21A and a rear surface 21B which is opposite to the front surface 21A; a hot cathode 25 for emitting thermoelectrons, positioned at the front surface side of the discharge shielding member 21; an anode 24 for receiving the thermoelectrons emitted from said hot cathode 25, mounted on and supported by the rear surface 21B of the discharge shielding member 21; a focusing electrode 26 having a focusing opening 262 for converging paths of the thermoelectrons and for passing through the thermoelectrons which is emitted from the hot cathode 25 and which is received by the anode 24; and a cathode box surrounding the hot cathode 25, for partially shielding discharge of the hot cathode 25. The cathode box is mounted on and supported by the front surface 21A of the discharge shielding member 21, and is electrically insulated from the focusing electrode 26. The cathode box is constituted by: a cathode slit electrode 27 located between the hot cathode 25 and the focusing electrode 26, having a slit 270 for passing through the thermoelectrons emitted from the hot cathode 25, and a front electrode 23 facing to the focusing electrode 26 so as to accommodate the hot cathode 25 and the cathode slit electrode 27 in a space defined by the front electrode 23 and the focusing electrode 26, the front electrode 23 having an opening window 230 located at a position which faces to the focusing opening 262 of the focusing electrode 26, for outputting ultraviolet light (U.V) caused by discharge. And, the cathode slit electrode 27 and the front electrode 23 of the cathode box are in direct contact with each other, thereby each electrode has the same potential.

Furthermore, as shown in FIG. 3, the discharge shielding member 21 has a recessed portion 211 at the rear surface 21B of the discharge shielding member 21, for accommodating the anode plate 24. As shown in FIG. 8, the recessed portion 211 of the discharge shielding member 21 has a depth W21 matching a sum of a height W225 of the projections 225 of the support member 21 and a thickness W24 of the anode 24, thereby the front surface 22B of the support member 22 is in partially contact with the rear surface 21B of the discharge shielding member 21. The discharge shielding member 21 is in contact with parts C2 (see FIG. 4) of the anode plate 24 at parts C1 of the rear surface 21B of said discharge shielding member 21. Therefore, the anode plate 24 covers an opening of the through hole 210 at the rear surface side of the discharge shielding member 21. The focusing electrode 26 is also supported by the discharge shielding member 21 and in contact with the front surface 21A of the discharge shielding member 21, thereby a distance between the focusing electrode 26 and the anode plate 24 is kept at a constact distance.

The light-emitting section, as shown in FIGS. 2 and 4, further comprises a support member 22 of an insulator, such-as a ceramic, being in the glass envelope 11 and located on an opposite side to the discharge shielding member 21 through the anode plate 24, the support member 22 having projections 225 for pushing parts C4 of the anode plate 24 onto parts C1 of the rear surface 21B of the discharge shielding member 21. Therefore, the parts C1 of the discharge shielding member 21 are brought into contact with the parts C2 of the anode plate 24, and the parts C3 of the support member 22 are brought into contact with the parts C4 of the anode plate 24. Particularly, a top surface of each projection 225 contains the part C3 contacting the associated part C4 of the anode plate 24, but other part of the top surface of each projection 225 faces the rear surface 21B of the discharge shielding member 21 without contacting the anode plate 24. As a result, the anode plate 24 is gripped at a plurality of parts thereof, and the present invention obtains a structure that is effective to increase the heat radiation efficiency of the anode plate. In other words, this structure decreases the area which contacts the insulator having a lower heat conductivity.

The support member 22 further has a depression 224 at a front surface 22B which faces to the rear surface 24B of the anode 24, thereby the depression 224 of the support member 22 provides heat dissipation space for the anode 24.

Next, as shown in FIGS. 9, 11, and 12, a lighting device for a gas discharge shielding of the present invention, for a gas discharge tube which has at least an anode, a focusing electrode, and a hot cathode, comprises: an anode terminal 142 adapted to be electrically connected to the anode of the gas discharge tube; a focusing electrode terminal 132 adapted to be electrically connected to the focusing electrode of the gas discharge tube; a first and second cathode terminals 152 and 162 adapted to be electrically connected to both ends of the hot cathode of the gas discharge tube; a cathode heating voltage source $V_F$ for heating the hot cathode, disposed between the first and second cathode terminals 152 and 162; an electric field generating voltage source $V_O$ for generating an electric field from the anode to the hot cathode of the gas discharge tube, disposed between the anode terminal 142 and the first and second cathode terminals 152 and 162; a discharge start circuit for supplying a trigger voltage to the focusing electrode in order to start discharge between the hot cathode and the focusing electrode; and a luminance adjustment circuit for adjusting a potential to be supplied to the focusing electrode of the gas discharge tube.

A first terminal V10 of the electric field generating voltage source $V_O$ is electrically connected to the anode terminal 142, and a second terminal V20 of the electric field generating voltage source $V_O$ is electrically connected to the first and second cathode terminal 152 and 162. A first terminal V30 of the cathode heating voltage source $V_F$ is electrically connected to the first cathode terminal 152, and a second terminal V40 of the cathode heating voltage source $V_F$ is electrically connected to the second cathode terminal 162. Particularly, the luminance adjustment circuit is constituted by the luminance adjustment voltage source $v_A$ and the variable resistor $R_V$ arranged in series so that a second terminal V60 of the luminance adjustment voltage source $V_A$ and a first terminal R10 of the variable resistor $R_V$ are connected to each other. A first terminal V50 of the luminance adjustment voltage source $V_A$ is electrically connected to the first and second cathode terminal 152 and 162, and a second terminal R20 of the variable resistor $R_V$ will be electrically connected to the focusing electrode terminal 132 through a luminance adjustment switch $S_A$.

The discharge start circuit as a first embodiment, as shown in FIG. 9, comprises an RC parallel circuit disposed between the anode terminal 142 and the focusing electrode terminal 132. A first terminal RC10 of the RC parallel circuit will be electrically connected to the focusing electrode terminal 132 through the luminance adjustment switch $S_A$, and a second terminal RC 20 of the RC parallel circuit will be electrically connected to the anode terminal 142 through a trigger switch $S_T$.

The discharge start circuit as a second embodiment, as shown in FIG. 11, is constituted by a fixed resistor $R_C$ and a capacitor C. A first terminal R30 of the fixed resistor $R_C$ is electrically connected to the anode terminal 142, and a second terminal R40 of the fixed resistor $R_C$ will be connected to a second terminal C20 of the capacitor C. A first terminal C10 of the capacitor C is electrically connected to the first and second cathode terminals 152 and 162, and the second terminal C20 of the capacitor C will be electrically connected to one of the second terminal R40 of the fixed resistor $R_C$ and the focusing electrode terminal 132 through the trigger switch $S_T$ and the luminance adjustment switch $S_A$.

The discharge start circuit as a third embodiment, as shown in FIG. 12, comprises a discharge start voltage source $V_T$ and an RC series circuit arranged in parallel. A first terminal V70 of the discharge start voltage source $V_T$ will be electrically connected to the second terminal RC40 of the RC series circuit through the trigger switch $S_T$, and a second terminal V80 of the discharge start voltage source $V_T$ is electrically connected to the first and second cathode terminals 152 and 162. A first terminal RC30 of the RC series circuit is electrically connected to the first and second cathode terminals 152 and 162, and a second terminal RC40 will be electrically connected to one of the anode terminal 142 and the first terminal V70 of the discharge start voltage source $V_T$ through the trigger switch $S_T$.

The operation for the above lighting device of the present invention is carried out tube as follows. First, the cathode heating voltage source $V_F$ supplies a predetermined voltage to the hot cathode for heating the hot cathode, sequentially (after the hot cathode has been heated) the discharge start voltage source $V_O$ supplies a predetermined voltage between the anode and the hot cathode. After an electric field is generated from the anode to the hot cathode, the discharge start circuit supplies a predetermined voltage sufficient to generate discharge between the hot cathode and one of the focusing electrode and the anode, to one of the focusing electrode and the anode. From now on, the luminance adjustment circuit adjusts a potential of the focusing electrode by supplying a predetermined voltage so as to set the potential of the focusing electrode at zero or a negative value.

In the gas discharge tube of the present invention, the focusing electrode is electrically insulated from the cathode slit electrode and the front electrode. With this structure, after the hot cathode is sufficiently heated, and a predetermined electric field is supplied to a space between the hot cathode and the anode, a positive potential higher than that of the front electrode and the cathode slit electrode will be supplied to the focusing electrode in generation of a trigger discharge between the hot cathode and the focusing electrode. For this reason, the trigger discharge area extending from the cathode extends from a space surrounded by the front electrode and the cathode slit electrode, i.e., a space in the cathode box to reach the focusing electrode. Therefore, arc discharge will be easily generated between the hot cathode and the anode.

In addition, in the lighting device for the gas discharge tube of the present invention, the luminance adjustment circuit constituted by the luminance adjustment voltage source, the variable resistor, and the luminance adjustment switch, all of which are sequentially arranged in series, is arranged between the hot cathode and the focusing electrode. With this arrangement, when the luminance adjustment switch is set in an ON state with respect to the luminance adjustment circuit upon occurrence of arc discharge, a zero potential or a negative potential will be supplied from the luminance adjustment voltage source to the focusing electrode through the variable resistor. Since the focusing electrode repels electrons and attracts cations, an ion sheath is generated in a space in front of or near the focusing electrode. Therefore, the arc ball can be compressed or focused by this ion sheath.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The arrangement and function of a gas discharge tube according to the first embodiment of the present invention will be described below in detail with reference to FIGS. 1 to 13. Note that the gas discharge tube of this embodiment is a side-on type deuterium discharge tube which extracts light (U.V) from the side portion of the tube.

Figure 1:
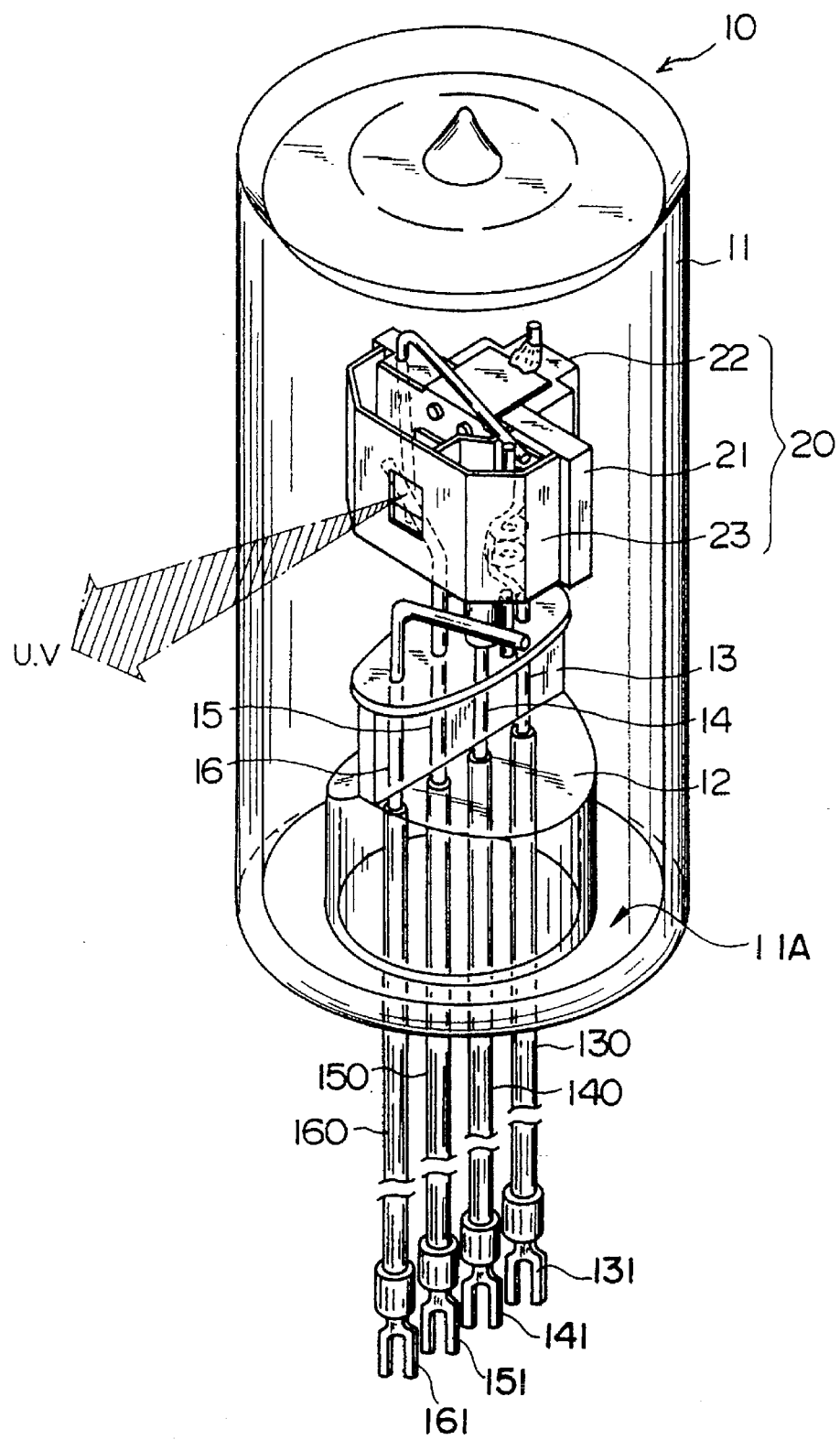
FIG. 1 is a perspective view showing a gas discharge tube according to the present invention.

In a gas discharge tube 10 shown in FIG. 1, a light-emitting section 20 is accommodated in a glass envelope 11 while being supported by lead pins 13 to 16. Deuterium gas in the glass envelope 11 is sealed at about several Torr. The envelop 11 with its head portion sealed has a cylindrical shape, and the bottom portion of the envelope 11 is hermetically sealed by a glass stem 12. The envelop 11 is formed of ultraviolet light transmitting glass or quartz glass having a high permeability to ultraviolet light.

The four lead pins 13 to 16 which are in parallel aligned in line extend through the glass stem 12 from the bottom portion of the light-emitting section 20, and are covered by insulating members 130, 140, 150, and 160, respectively. Terminals 131, 141, 151, and 161 will be connected to terminals 132, 142, 152, and 162 of an external power supply. The light-emitting section 20 has a shielding box structure in which a ceramic support member 22 and a metal front electrode 23 are bonded each to other while a ceramic discharge shielding member (spacer) 21 is sandwiched therebetween. The anode plate 24 is sandwiched by the discharge shielding member 21 and the support member 22, and is accommodated in a space defined by these members 21 and 22.

The embodiments of this invention relate to for example U.S. patent application Ser. No. 08/305,972, Japanese Patent Laid-Open No. 4-255662; and the like. Particularly, a basic structure of the gas discharge tube and materials of members such as anode, etc. are described in these references.

For example, the discharge shielding member 21 and the support member 22 are made of ceramic as insulator, and the anode plate 24 is made of metal, such as molybdenum, with a high melting point. In this specification, a high melting metal means a material group having a melting point higher than silicon (1414° C.).

The structure of the light-emitting section 20 will be described below in detail with reference to FIGS. 2 to 8.

Figure 2:
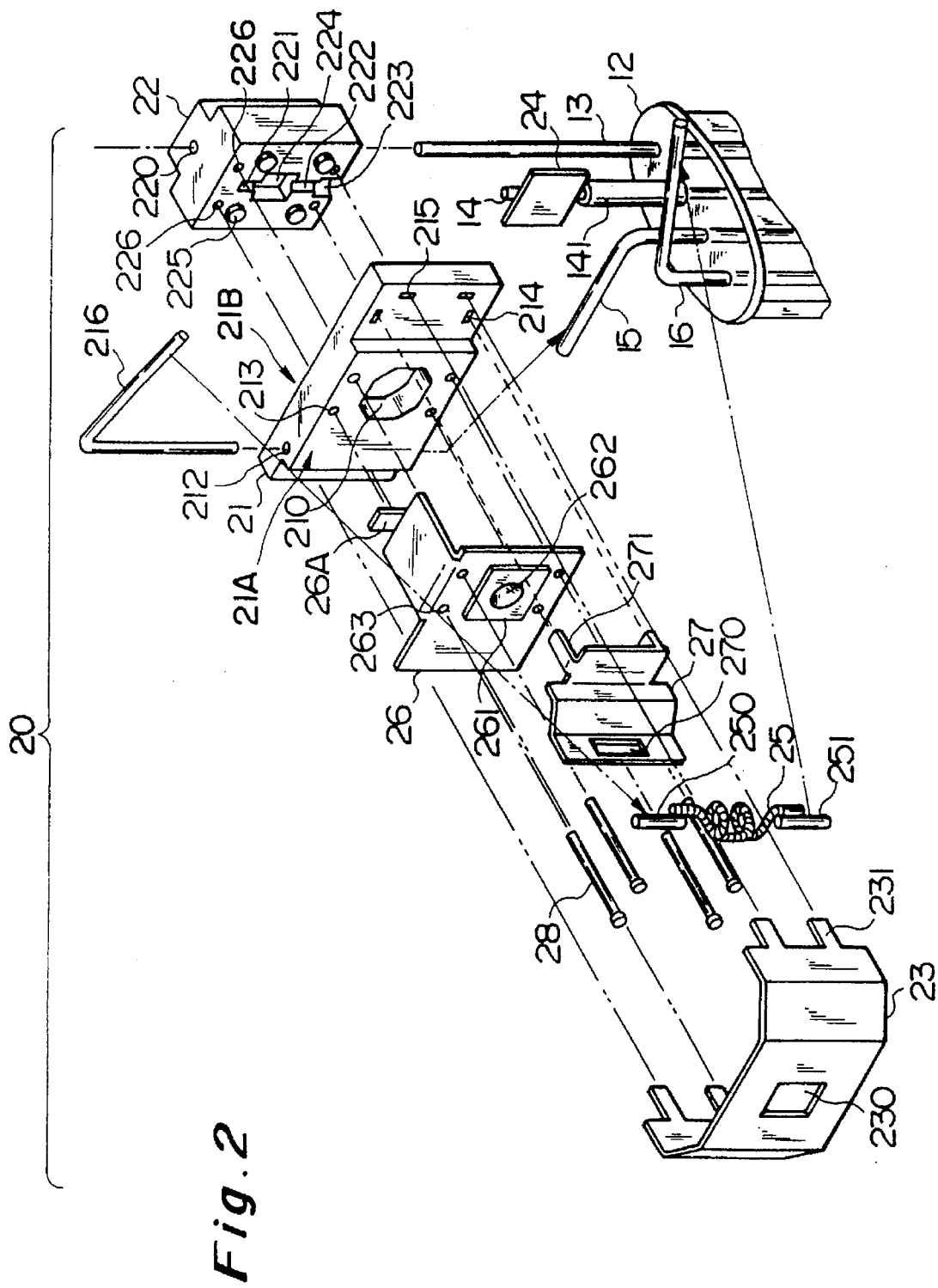
FIG. 2 is an exploded perspective view of a light-emitting portion of the gas discharge tube 20 in FIG. 1.
Figure 3:
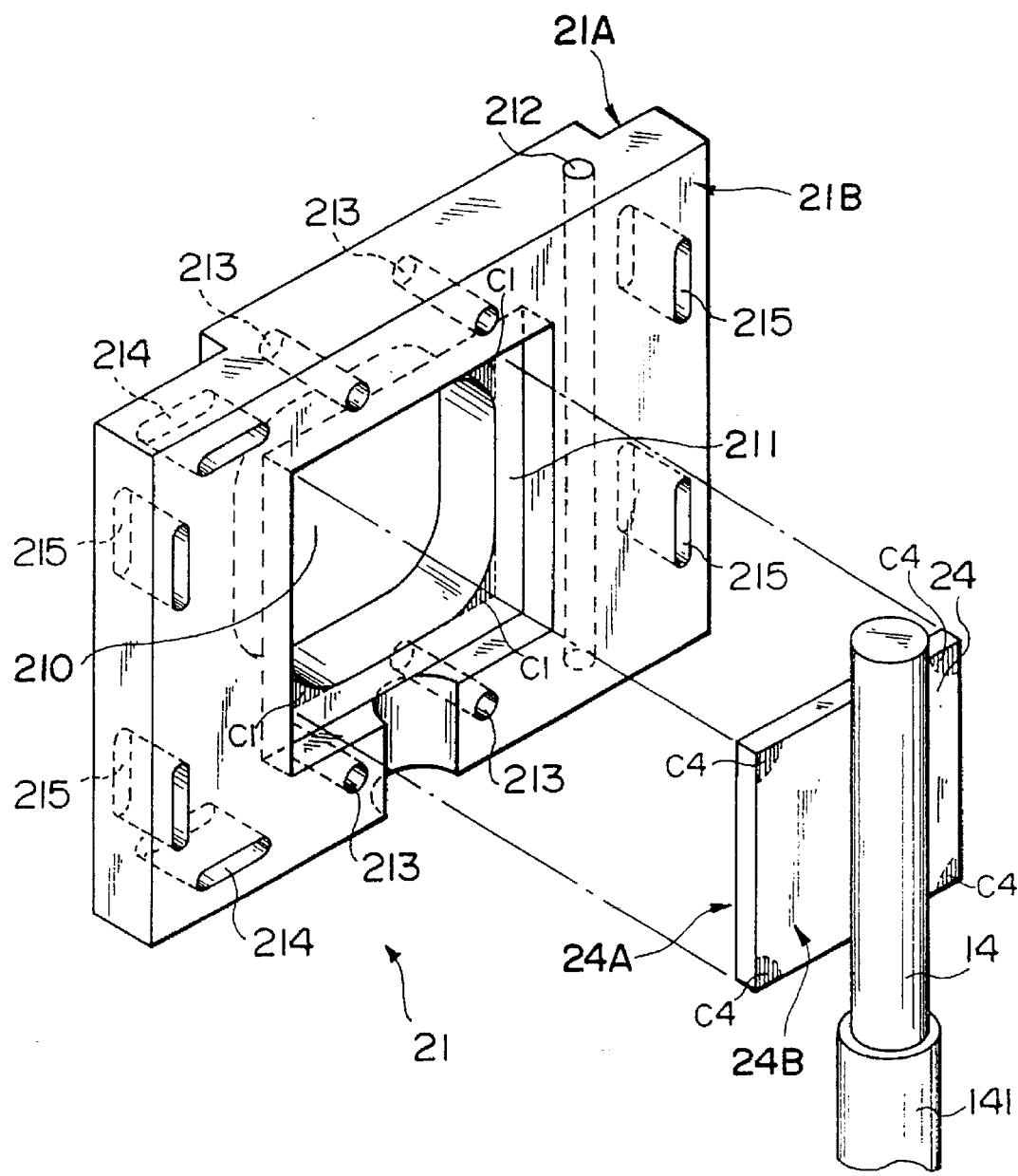
FIG. 3 is a perspective view showing a discharge shielding member and an anode in the light-emitting portion in FIG. 2 before assembly.

As shown in FIGS. 2 and 3, the flat plate-like discharge shielding member 21 has a swell section thinner and wider than the support member 22. The discharge shielding member 21 has a through hole 210, a recessed portion 211, a vertical through hole 212, four horizontal through holes 213, two horizontal through holes 214 and four horizontal through holes 215. The through hole 210 extends through the discharge shielding member 21 almost at its central portion to oppose the anode 24. The recessed portion 211 is recessed from the rear surface 21B of the discharge shielding member 21. The recessed portion 211 also includes an opening edge portion located on the rear surface side of the through hole 210. The vertical through hole 212 extends in the vertical direction with respect to the bottom surface 11A of the envelope 11, and passes through the discharge shielding member 21. The four horizontal through holes 213 respectively extend in the horizontal direction with respect to the bottom surface 11A of the envelope 11 . The two horizontal through holes 214 of the discharge shielding member 21 are formed at positions to insert lock pawls 271 of a cathode slit electrode 27 (to be described later). The four horizontal through holes 215 are formed at positions to insert lock pawls 231 of the front electrode 23 (to be described later).

One side of a substantially L-shaped electrode rod 216 is inserted in the vertical through hole 212, and the lower end of the electrode rod 216 is exposed from the discharge shielding member 21 so as to be welded to the distal end of the lead pin 15. Therefore, the discharge shielding member 21 will be held by the glass stem 12 through the electrode rod 216. Electrode rods 250 and 251 are welded to the two ends of a hot cathode (filament) 25. The electrode rod 250 is welded to the distal end of the electrode rod 216, and the electrode rod 251 is welded to the distal end of the lead pin 16. With this structure, the hot cathode 25 will be held by the stem 12.

Figure 4:
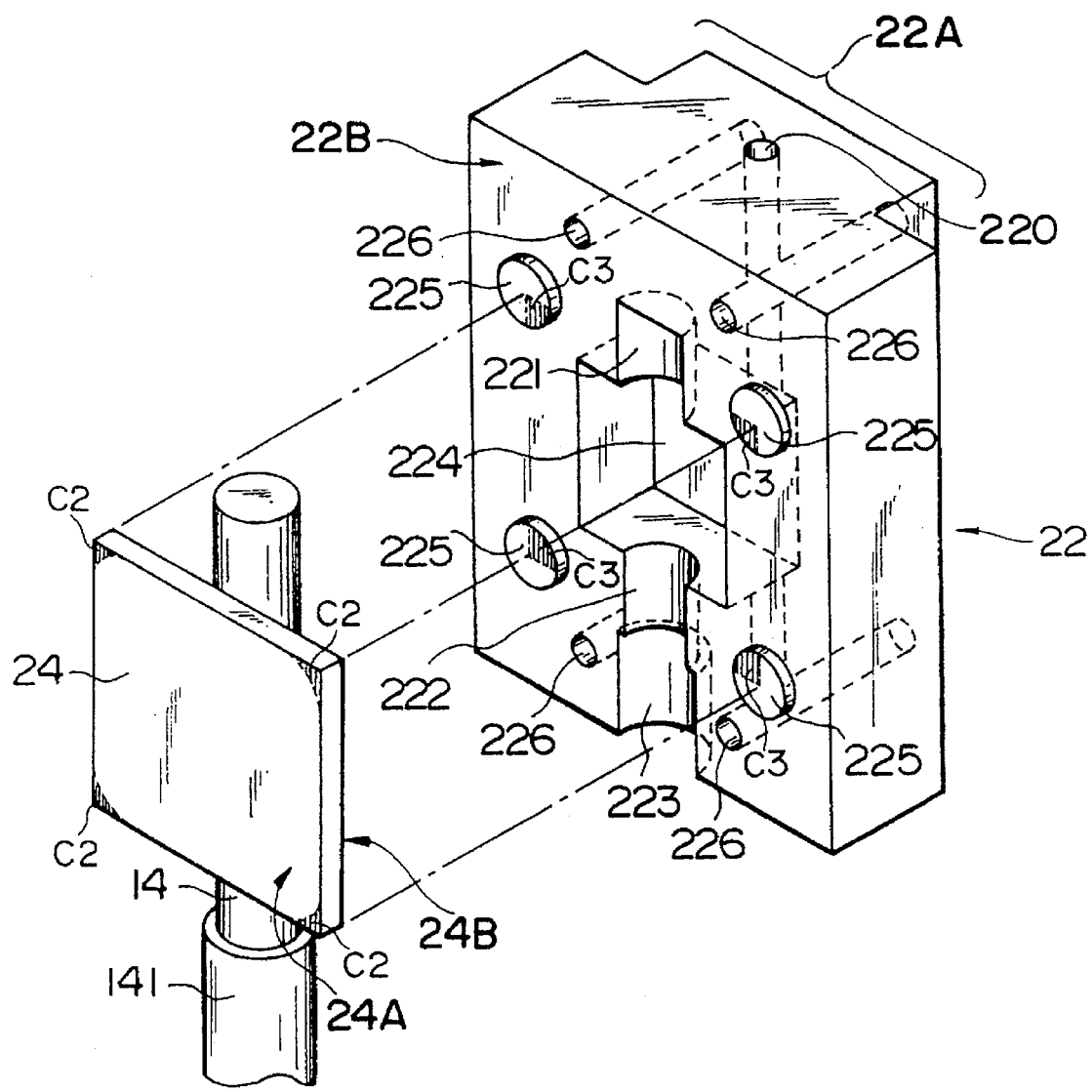
FIG. 4 is a perspective view showing a support member and the anode in the light-emitting portion in FIG. 2 before assembly.

As shown in FIGS. 2 and 4, the support member 22 is a prism having a swell section 22A. A vertical through hole 220, concave grooves 221 to 223, a depression 224; four protrusions portions (projections 225), and four horizontal through holes 226 are formed in the support member 22. The vertical through hole 220 vertically extends in the vertical direction with respect to the bottom surface 11A of the envelope 11, and passes through the section 22A of the support member 22. The concave grooves 221 to 223 and the depression 224 are recessed on the front surface 22B of the support member 22 and sequentially extend toward the bottom surface 11A of the envelop 11, thereby appropriately accommodating the lead pin 14 and an insulating member 141. The four projections 225 are formed close to the opening edge portions of the concave grooves 221 and 222 and project from the front surface 22B of the support member 22 so as to oppose the corners of an anode plate 24. The four horizontal through holes 226 extend in the horizontal direction to oppose four the horizontal through holes 213 of the discharge shielding 21.

The support member 22 is held by the glass stem 12 through the lead pin 13 inserted in the vertical through hole 220 and the lead pin 14 accommodated in the concave grooves 221 to 223. The rectangular flat plate-like anode 24 is welded and fixed to the distal end of the lead pin 14 and pushed onto the rear surface side of the discharge shielding member 21 by the four projections 225 of the support member 22. A heat dissipation space is ensured at the back of the anode 24 by providing the depression 224 having an opening substantially matching the surface area of the anode 24.

Figure 5:
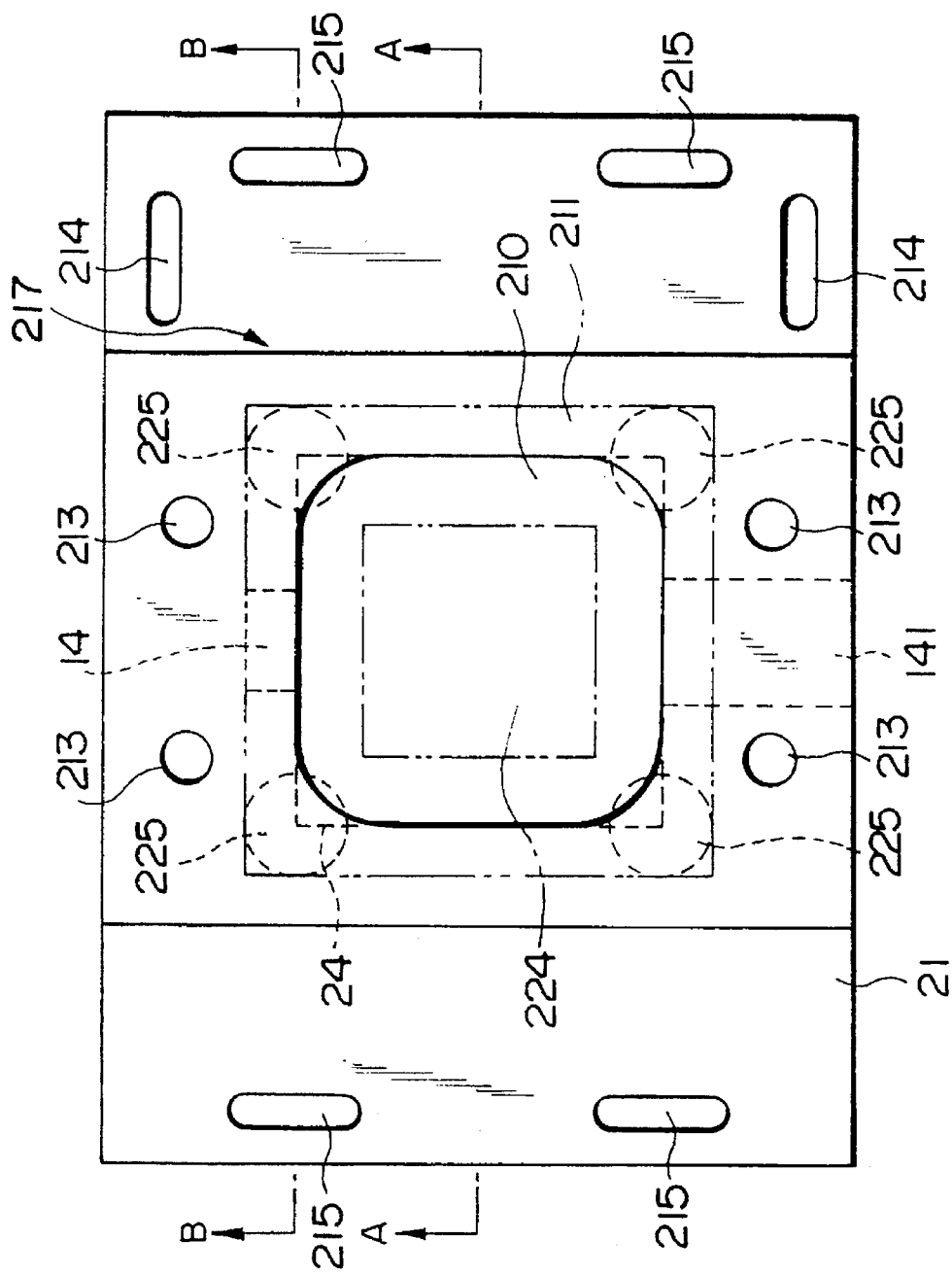
FIG. 5 is a plan view showing a positional relationship among the discharge shielding member, the anode, and the support member in the light-emitting portion in FIG. 2.
Figure 7:
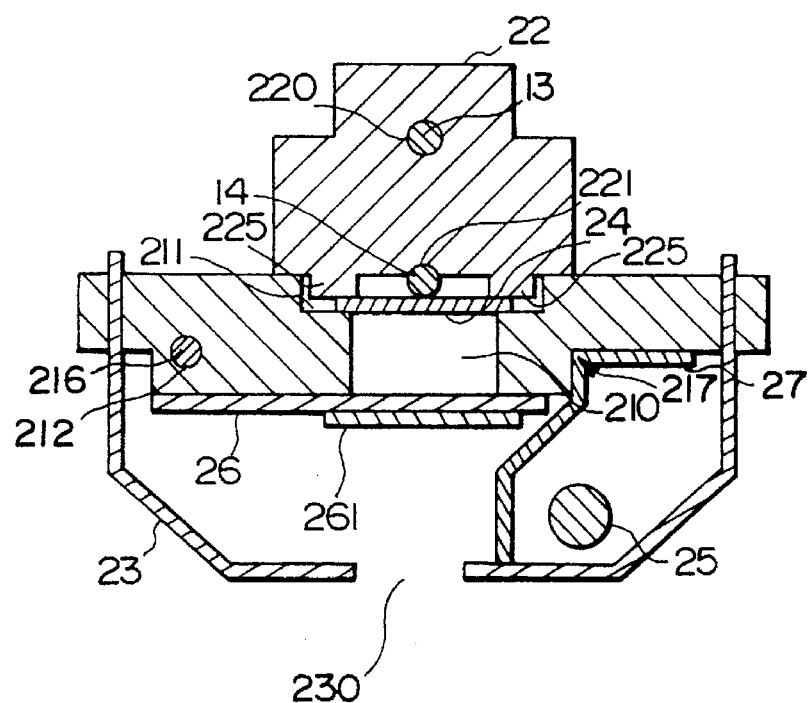
FIG. 7 is a sectional view taken along a line B—B in FIG. 5.
Figure 8:
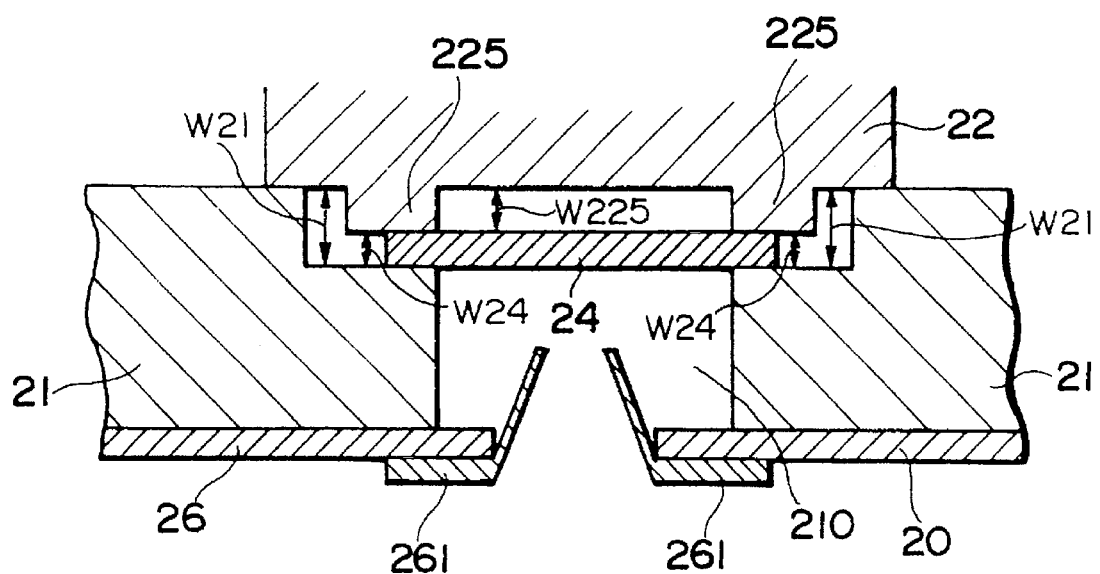
FIG. 8 is a sectional view for explaining a structure of the recessed portion of the discharge shielding member in FIG. 3.

As shown in FIGS. 5, 7, and 8, the rectangular anode 24 indicated by a broken line is accommodated in the recessed portion 211 of the discharge shielding member 21. The corner portions of the anode 24 are sandwiched by cooperation of the bottom surface 11A of the step portion 211 of the discharge shielding member 21 and the four projections 225 of the support member 22. The four sides of the anode 24 almost match the slightly round through hole 210 having a substantially rectangular shape. The remaining portion of the opening edge portion of the through hole 210 is joined to the four corner portions of the anode 24. The four projections 225 each having a circular surface are joined to the four corner portions of the anode 24, thereby pressing the anode 24. In particular, as shown in FIG. 8, the rectangular recessed portion 211 has a depth Wac matching the sum of the height W225 of the four projection 225 and the thickness W24 of the anode 24. As a result, the peripheral portion formed on the front surface 22B of the support member 22 will be brought into contact with the rear surface 21B of the discharge shielding member 21.

On the other hand; as shown in FIGS. 3 and 4, the parts C1 of the rear surface 21B of the discharge shielding member 21 are brought into contact with the parts C2 of the anode plate 24, and the parts C3 of the top surface of each projection 225 are brought into contact with the parts C4 of the anode plate 24. Thereby, the anode plate 24 is gripped by the projections 225 and the rear surface 21B of the discharge shielding member 21. The top surface of each projection 225 is defined by the part C3 contacting the associated part C4 of the anode plate 24 and other part facing the rear surface 21B of the discharge shielding member 21 without contacting the anode plate 24. That is, this structure increase the heat racdiatio efficiency of the anode plate 24 because a specific area of the anode plate 24 decreases, the area being directly contact with insulator (the discharge shielding member 21, the support member 22, etc.) having a lower heat conductivity decreases.

Figure 6:
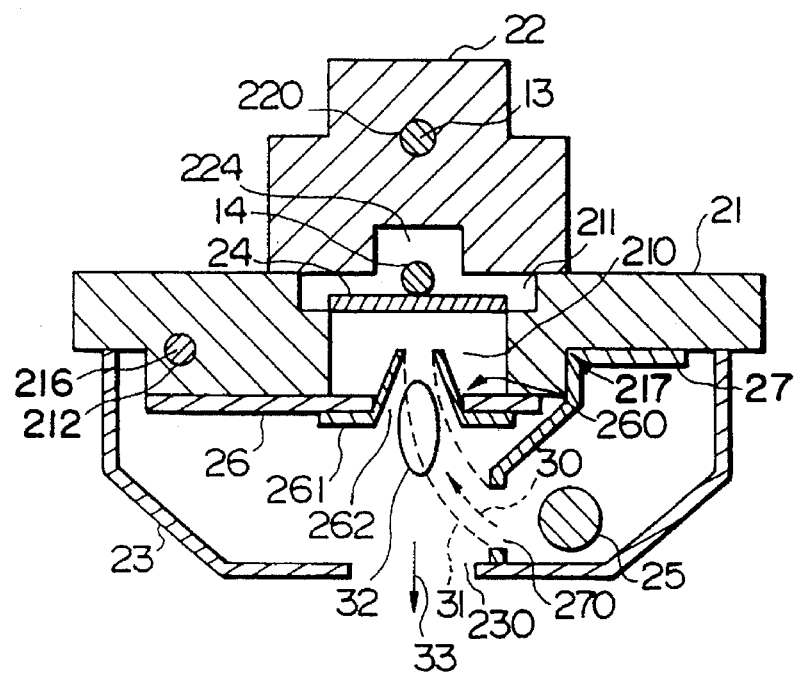
FIG. 6 is a sectional view taken along a line A—A in FIG. 5.

As shown in FIGS. 2 and 6, a focusing electrode 26 constituted by bending a metal plate into a substantially L-shape and an opening limit plate 261, and has an opening 260 and four horizontal through holes 263. The focusing opening 260 is arranged coaxial with the through hole 210 of the discharge shielding plate 21. An opening limit plate 261 for limiting the diameter of the opening is welded to the peripheral region of the opening 260. The opening limit plate 261 has a focusing opening 262 bent toward the anode 24 to pass through the opening 260. The four horizontal through holes 263 extend in the direction of thickness of the focusing electrode 26 and oppose the four horizontal through holes of the discharge shielding member 21.

The focusing electrode 26 is arranged so as to be in contact with the front surface 21A of the discharge shielding member 21. Since a distal end portion 26A bent backward is welded to the distal end of the lead pin 13 projecting from the support member 22, the focusing electrode 26 is fixed to the discharge shielding member 21 and the support member 22. Note that the distance between the opening limit plate 261 and the anode 24 is smaller than the thickness of the discharge shielding member 21. The horizontal through holes 226 of the support member 22, the horizontal through holes 213 of the discharge shielding member 21, and the horizontal through holes 263 of the focusing electrode 26 are aligned in line. Therefore, when the discharge shielding member 21, the support member 22, and the focusing electrode 26 are bonded each other, and four metal rivets 28 are inserted into the through holes, all these components will be integrally fixed to the stem 12.

As shown in FIGS. 2, 6, and 7, the cathode slit electrode 27 is bent at three portions in correspondence with the shape of the stepped portion 217 of the discharge shielding member 21 and has an opening (slit 270) and two lock pawls 271. With respect to the bottom surface 11A of the envelope 11, the opening 270 having a vertically elongated rectangular shape extends through the cathode slit electrode 27. The two lock pawls 271 formed at the upper and lower ends of the cathode slit electrode 27 are bent backward.

The cathode slit electrode 27 opposes the hot cathode 25 and is positioned in front surface side of the discharge shielding member 21 on its one side. When the two lock pawls 271 are inserted into the two horizontal through holes 214 of the discharge shielding member 21, the cathode slit electrode 27 is engaged with the discharge shielding member 21. Note that the slit 270 is arranged between the hot cathode 25 and the opening limit plate 261.

The metal front electrode 23 is bent at four portions to have a substantially U-shaped section and has an opening window 230 and four lock pawls 231. The rectangular opening window 230 is arranged coaxial with the focusing opening 262 of the focusing electrode 26. The four lock pawls 231 formed at the corners of the front electrode 23 project backward. Note that the opening window 230 is arranged at a position to project ultraviolet light from the space in front of or near the focusing opening 262.

The front electrode 23 is arranged at the front surface 21A of the discharge shielding member 21 on its both sides. When the four lock pawls 231 are inserted into the four horizontal through holes 215 of the discharge shielding member 21, the front electrode 23 is engaging with the discharge shielding member 21. The front end of the cathode slit electrode 27 is brought into contact with the inner wall of the front electrode 23, thereby separating a space where the hot cathode 25 is arranged from a light-emitting space where arc discharge occurs.

The operation of this embodiment will be described below.

When a power of about 10 W is supplied from the external power supply in 20 seconds before discharge, a predetermined rated voltage is applied to the hot cathode 25, and the hot cathode 25 is preheated. After the hot cathode 25 is sufficiently heated, a DC open voltage of about 150 V is applied between the hot cathode 25 and the anode 24.

Upon completion of preparation for arc discharge, a trigger voltage of 350 to 500 V is applied between the hot cathode 25 and the anode 24, thereby starting arc discharge among the hot cathode 25, the focusing electrode 26, and the anode 24. At this time, the path of thermoelectrons moving in a direction indicated by an arrow 30 is limited to only a discharge path 31 because of the convergent effect of the opening limit plate 261 of the focusing electrode 26 and the shielding effect of the cathode slit electrode 27 and the front electrode 23. More specifically, the thermoelectrons emitted from the hot cathode 25 pass through the focusing opening 262 of the opening limit plate 261 from the slit 270 of the cathode slit electrode 27 and through the through hole 210 of the discharge shielding member 21 and are received by the anode 24.

An arc ball 32 as a high-density discharge area by arc discharge is generated in a space in front of or near the opening limit plate 261 on the opposite side to the anode 24 through the discharge shielding member 21. Ultraviolet light (U.V) extracted from the arc ball 22 as positive column light emission is emitted toward the front of the anode 24, i.e., in a direction indicated by an arrow 33 and is projected through the opening window 230 of the front electrode 23.

The anode 24 and the focusing electrode 26 are arranged so as to be in contact with the two opening edge portions of the through hole 210 through the discharge shielding member 21. For this reason, the insulated state between the two electrodes 24 and 26 is maintained by the insulating properties of the material of the discharge shielding member 21. Upon occurrence of arc discharge, the anode 24 receives thermoelectrons to generate heat, and the focusing electrode 26 also generates heat upon bombardment of cations.

However, the through hole 210 of the discharge shielding member 21 hardly covers the front surface 24A of the anode 24, and the front surface 24A of the anode 24 is exposed at maximum. The projections 225 of the support plate 22 are barely in contact with the rear surface 24B of the anode 24, and the rear surface 24B of the anode 24 is exposed at maximum. The depression portion 224 of the support member 22 enlarges the back space of the anode 24. For this reason, heat dissipation from the anode 24 and the focusing electrode 26 is promoted. Although the material constituting the discharge shielding member 21 and the support member 22 and having electrical insulating properties generally has a low thermal conductivity, the temperature in the space near the anode 24 and the focusing electrode 25 can be maintained at a relatively low level.

As a result, for the anode 24 and the focusing electrode 26 of the present invention, deformation of the material due to a residual stress in a high temperature state, or a loss of the material due to an evaporation or sputtering phenomenon can be minimized. More specifically, a variation in distance between the two electrodes or energization hardly makes the arc discharge state unstable. Additionally, a loss of the material of the two electrodes hardly makes it difficult to generate arc discharge. Therefore, for long-time continuous light emission, the positions of the anode 24 and the focusing electrode 26 are precisely held, thereby realizing a continuously stable operation for a long time.

In particular, in the focusing electrode 26, the cathode slit electrode 27, and the front electrode 23 having the above arrangement, the focusing electrode 26 is electrically insulated from the cathode slit electrode 27 and the front electrode 23 through the discharge shielding member 21. On the other hand, the cathode slit electrode 27 and the front electrode 23 are in contact with each other and set at the same potential, for example a zero potential.

The arrangement of a first embodiment of the lighting circuit connected to the gas discharge tube according to the present invention, will be described below with reference to FIG. 9.

Figure 9:
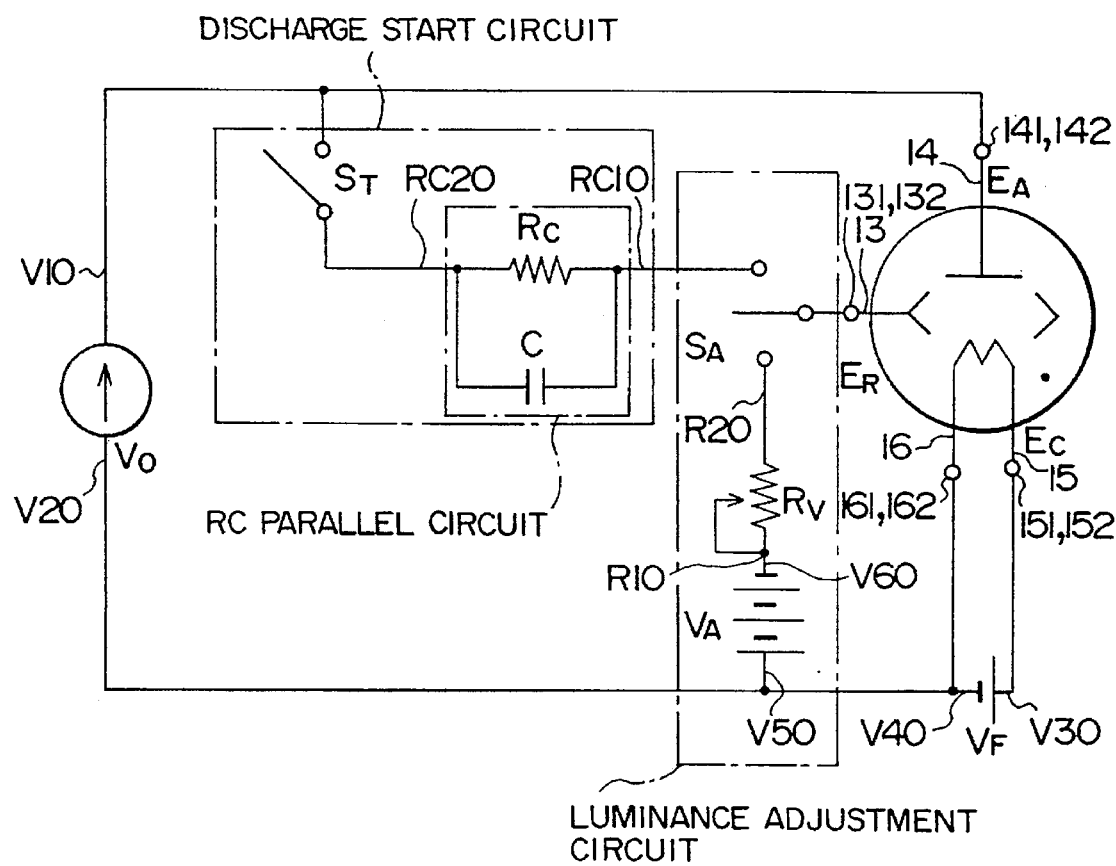
FIG. 9 is a circuit diagram showing a lighting device for the gas discharge tube in FIG. 1, as a first embodiment of the present invention.

As shown in FIG. 9, this lighting device is formed as an auxiliary electrode system. The lighting device has an anode terminal 142 to be connected to the terminal 141 fixed at the distal end of lead pin 14, a focusing electrode terminal 132 to be connected to the terminal 131 fixed at the distal end of the lead pin 13, a first cathode terminal 152 to be connected to the terminal 151 fixed at the distal end of the lead pin 15, and a second cathode terminal 162 to be connected to the terminal 161 fixed at the distal end of the lead pin 16. Between ends of the hot cathode ($E_C$), a cathode heating voltage source ($V_F$) is disposed, and the first terminal V30 and the second terminal V40 of the cathode heating voltage source $V_F$ are respectively connected to the first and second cathode terminals 152 and 162. An electric field generating voltage source $V_O$ is disposed between the hot cathode ($E_C$) 25 and the anode ($E_A$) 24, and the first terminal V10 and the second terminal V20 of the electric field generating voltage source $V_O$ are respectively connected to the anode terminal 142 and the first and second cathode terminals 152 and 162. Note that the cathode 25 is set at a voltage of about 2.5 V as a cathode filament rated value. The electric field generating voltage source $V_O$ supplies a DC open voltage of about 150 V and a constant current of about 300 mA.

As a discharge start circuit, an RC parallel circuit formed of a capacitor C and a fixed resistor $R_C$ which are connected in parallel to each other and a trigger switch $S_T$ connected in series with the above circuit are disposed between the anode ($E_A$) 24 and the focusing electrode ($E_R$) 26. The first terminal RC10 of the RC parallel circuit will be connected to the focusing electrode terminal 132 through a luminance adjustment switch $S_A$, and the second terminal RC20 of the RC parallel circuit will be connected to the anode terminal 142 through the trigger switch $S_T$. Therefore, the trigger switch $S_T$ functions to electrically connect the second terminal RC20 of the RC parallel circuit to the anode terminal 142, and the luminance adjustment switch $S_A$ functions to electrically connect the first terminal RC10 of the RC parallel circuit to the focusing electrode terminal 132 at a predetermined timing.

As a luminance adjustment circuit, a luminance adjustment voltage source $V_A$ and a variable resistor $R_V$ are disposed in series between the hot cathode ($E_C$) 25 and the focusing electrode ($E_R$) 26. The first terminal V50 of the luminance adjustment voltage source $V_A$ is connected to the first and second terminals 152 and 162, and the second terminal R20 of the variable resistor $R_V$ will be connected to the focusing electrode terminal 132 through the luminance adjustment switch $S_A$. Therefore, the luminance adjustment switch $S_A$ also functions to connect the second terminal R20 of the variable resistor $R_V$ to the focusing electrode terminal 132 at a predetermined timing.

The operation of this embodiment will be described below.

First of all, the trigger switch $S_T$ is set in an OFF state, and the luminance adjustment switch $S_A$ is set in an ON state with respect to the discharge start circuit. With this operation, a voltage of about 2.5 V is applied from the cathode heating voltage source $V_F$ to ends of the hot cathode ($E_C$) 25 for about 20 seconds before discharge, and the hot cathode ($E_C$) 25 is preheated. After the hot cathode ($E_C$) 25 is sufficiently heated to a temperature of about 1,100° C., a voltage of about 150 V is applied between the hot cathode ($E_C$) 25 and the anode ($E_A$) 24 from the electric field generating voltage source $V_O$, thereby generating an electric field from the anode ($E_A$) 24 to the hot cathode ($E_C$) 25.

Upon completion of preparation of trigger discharge, the trigger switch $S_T$ is set in an ON state. With this operation, a potential of about 150 V is supplied from the electric field generating voltage source $V_O$ to the focusing electrode ($E_R$) 26 through the capacitor C and the fixed resistor $R_C$ (RC parallel circuit), which are connected in parallel to each other, thereby generating trigger discharge between the hot cathode ($E_C$) 25 and the focusing electrode ($E_R$) 26.

Since the focusing electrode ($E_R$) 26 is electrically insulated from the cathode slit electrode 27 and the front electrode 23, a positive potential higher than that of the cathode slit electrode 27 and the front electrode 23, both of which are set at about 0 V, can be supplied to the focusing electrode ($E_R$) 26. For this reason, as shown in FIG. 6, a trigger discharge area 30 extending from the hot cathode ($E_C$) 25 extends from a space surrounded by the front electrode 23 and the cathode slit electrode 27, i.e, a space in the cathode box to reach the focusing electrode ($E_R$) 26. Therefore, trigger discharge is generated between the hot cathode ($E_C$) 25 and the focusing electrode ($E_R$) 26, so that the gas discharge tube 10 is properly lighted.

By generating trigger discharge in this manner, arc discharge is generated between the hot cathode ($E_C$) 25 and the anode ($E_A$) 24. The arc discharge stably continues on the basis of a current of about 300 mA, which is supplied between the hot cathode ($E_C$) 25 and the anode ($E_A$) 24 from the electric field generating voltage source $V_O$.

At this time, the paths of thermoelectrons is limited to only one discharge path because of the convergent effect of the opening limit plate 261 of the focusing electrode ($E_R$) 26 and the shielding effect of the cathode slit electrode 27 and the front window electrode 23. More specifically, the thermoelectrons emitted from the hot cathode ($E_C$) 25 pass through the focusing opening 262 of the opening limit plate 261 from the focusing opening 270 of the cathode slit electrode 27 and through the through hole 210 of the discharge shielding member 21 and are received by the anode ($E_A$) 24.

An arc ball as a high-density discharge area by arc discharge is generated in a space in front of the opening limit plate 261 on the opposite side to the anode ($E_A$) 24. Ultraviolet light (U.V) extracted from the arc ball as positive column light emission is projected toward the front of the anode 24 through the opening window 230 of the front electrode 23.

Upon occurrence of arc discharge, the luminance adjustment switch $S_A$ is set in an ON state with respect to the luminance adjustment circuit. With this operation, a potential of 0 V or a negative potential is supplied from the luminance adjustment voltage source $V_A$ to the focusing electrode ($E_R$) 26 through the variable resistor $R_v$. The focusing electrode ($E_R$) 26 repels electrons and attracts cations.

At this time, since an ion sheath is generated in a space in front of the focusing electrode ($E_R$) 26, the arc ball can be compressed or focused by this ion sheath. Therefore, when the resistance value of the variable resistor $R_v$ is appropriately set, the luminance of the gas discharge tube 10 can be highly increased.

Experiments for this embodiment will be described below.

For the gas discharge tube of this embodiment and a conventional gas discharge tube, trigger voltages required to be applied to the focusing electrodes for trigger discharge, i.e., discharge start voltages were measured. As a result, the discharge start voltage for the gas discharge tube of this embodiment was 90 to 100 V while that for the conventional gas discharge tube was 130 to 170 V. In the gas discharge tube of this embodiment, the discharge start voltage is included within a small variation range, and it is found that lighting is highly facilitated.

In addition, for the gas discharge tube of this embodiment, pulse lighting was repeatedly performed. As a result, no lighting failure was observed. Therefore, it is found that the reliability of lighting of the gas discharge tube of this embodiment is highly improved.

Figure 10:
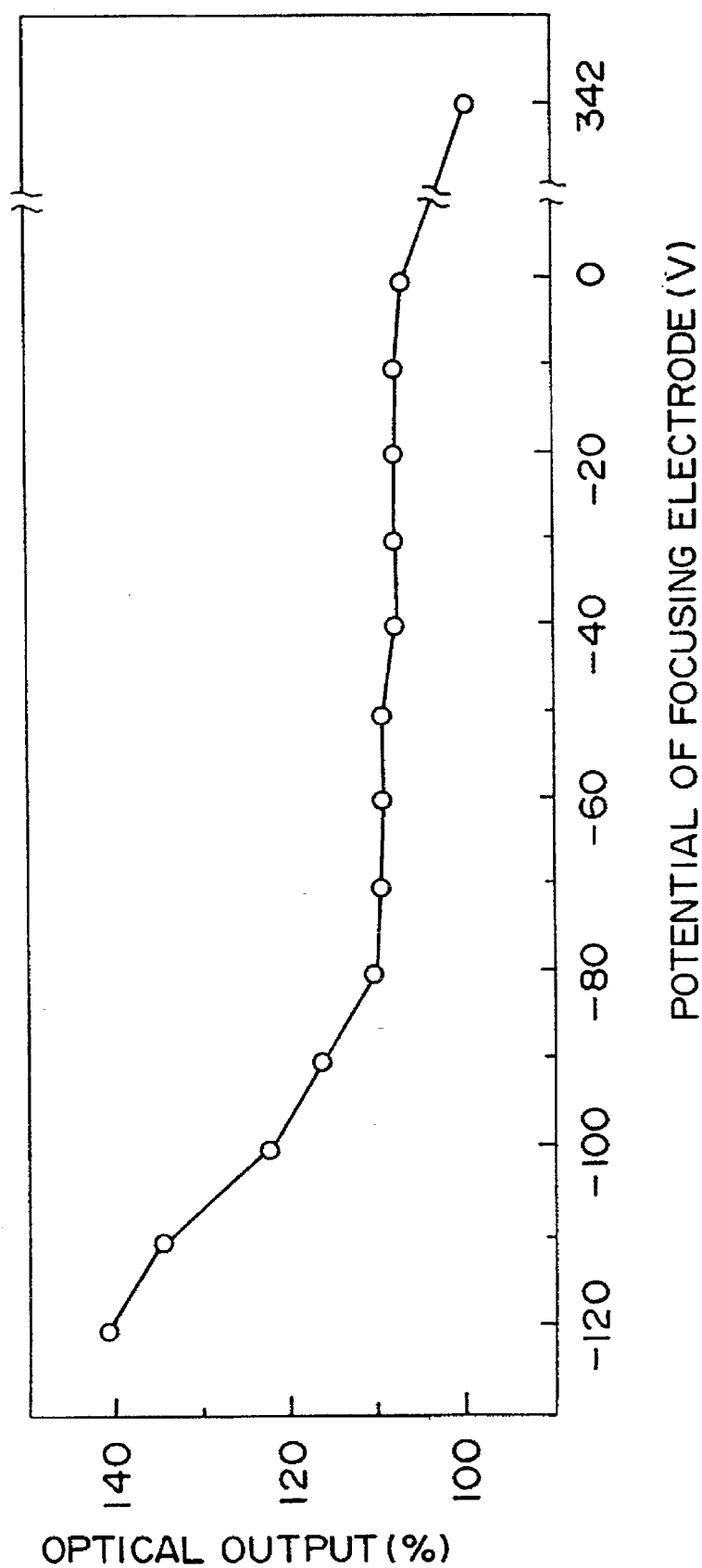
FIG. 10 is a graph showing a relationship between the potential of a focusing electrode of the gas discharge tube in FIG. 1 and an optical output.

Furthermore, for the gas discharge tube of this embodiment, the potential of the focusing electrode was changed on the basis of the resistance value of the variable resistor after lighting, and an optical output extracted from the positive column light emission was measured. As a result, as shown in FIG. 10, when the potential of the focusing electrode increased in the negative direction, the optical output increased. In this case, however, a positive potential of about 34 V is supplied to the focusing electrode from the luminance adjustment circuit. In FIG. 10, an optical output value corresponding to the potential of about 34 V is defined as 100%, and an optical output value corresponding to each potential of the focusing electrode is normalized and plotted.

As shown in FIG. 10, the amount of an increase in optical output is almost 10% when the potential of the focusing electrode is 0 V. The amount of an increase in optical output reaches almost 40% when the potential of the focusing electrode is −120 V. Therefore, it is found that, in the gas discharge tube of this embodiment, the light emission intensity will be easily adjusted and increased.

The arrangement and function of a second embodiment of the lighting device for the gas discharge tube according to the present invention, will be described below with reference to FIG. 11. The lighting device of this embodiment is different from the above embodiment (FIG. 9) only in the discharge start circuit.

Figure 11:
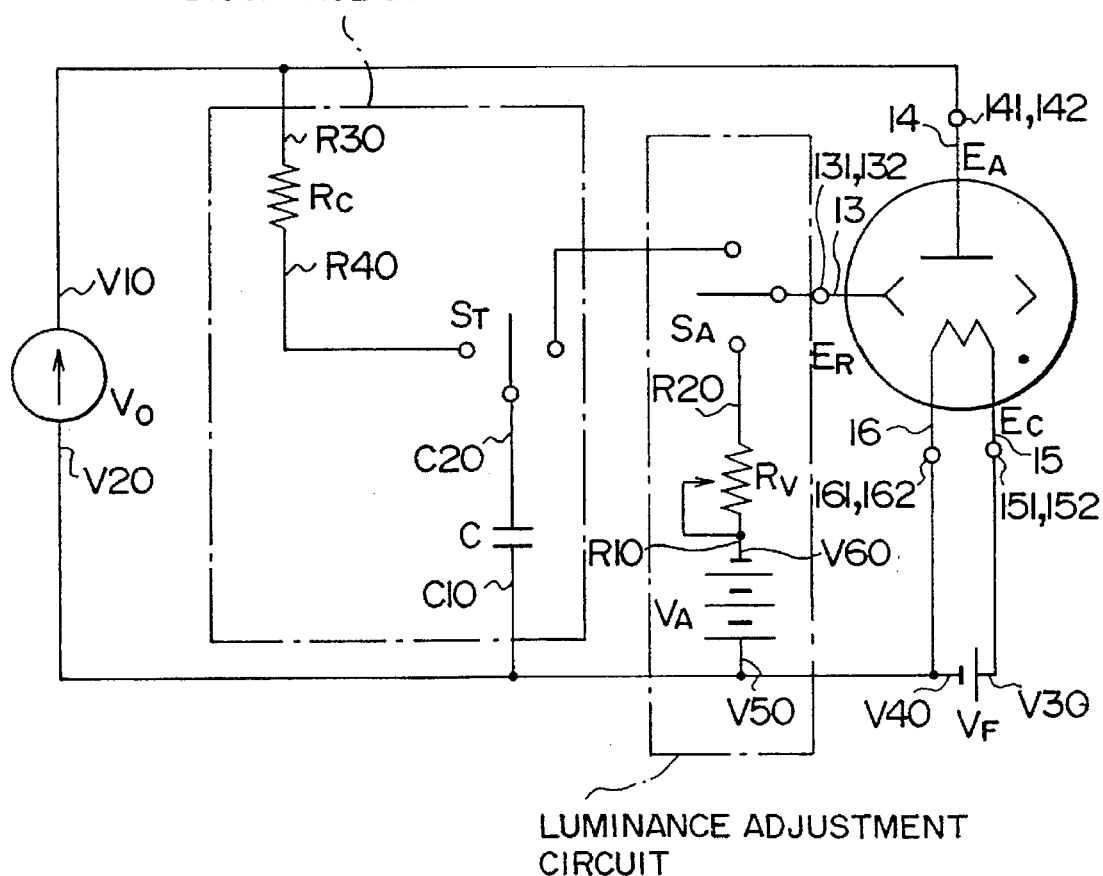
FIG. 11 is a circuit diagram showing the lighting device for the gas discharge tube in FIG. 1, as a second embodiment of the present invention.

As shown in FIG. 11, this lighting device is formed by as an auxiliary electrode system. The discharge start circuit is also disposed between the anode ($E_A$) 24 and the hot cathode ($E_C$) 25, and includes the fixed resistor $R_C$ and the capacitor C. The first terminal R30 of the fixed resistor $R_C$ is connected to the anode terminal 142, the second terminal R40 will be connected to the capacitor C through the trigger switch $S_T$. The first terminal C10 is connected to the first and second cathode terminals 152 and 162, and the second terminal C20 will be connected to one of the fixed resistor $R_C$ and the focusing electrode terminal 132 through the trigger switch $S_T$ and the luminance adjustment switch $S_A$. Therefore, the trigger switch $S_T$ functions to connect the capacitor C to one of the fixed resistor $R_C$ and the luminance adjustment switch $S_A$, and the luminance adjustment switch $S_A$ functions to connect the focusing electrode terminal 132 to one of the trigger switch $S_T$ and the luminance adjustment circuit.

According to this arrangement, first of all, the trigger switch $S_T$ and the luminance adjustment switch $S_A$ are set in an ON state with respect to the discharge start circuit, and thereafter, preparation for trigger discharge is made in the same manner as in the above embodiment. At this time, a voltage of about 150 V is applied from the electric field generating voltage source $V_O$ to the capacitor C through the fixed resistor $R_C$, and the capacitor C is sufficiently charged.

Subsequently, the trigger switch $S_T$ is set in an ON state with respect to the focusing electrode ($E_R$) 26, thereby supplying a potential of about 150 V to the focusing electrode ($E_R$) 26 by a pulse voltage based on discharge of the capacitor C. With this operation, trigger discharge occurs between the hot cathode ($E_C$) 25 and the focusing electrode ($E_R$) 26.

After the trigger switch $S_T$ is set in an OFF state, generation of arc discharge and adjustment of the luminance are performed in the same manner as in the above embodiment.

The arrangement and function of the third embodiment of the lighting device for the gas discharge tube according to the present invention, will be described below with reference to FIG. 12. The lighting device of this embodiment is different from the above embodiment (FIG. 9) only in the discharge start circuit.

Figure 12:
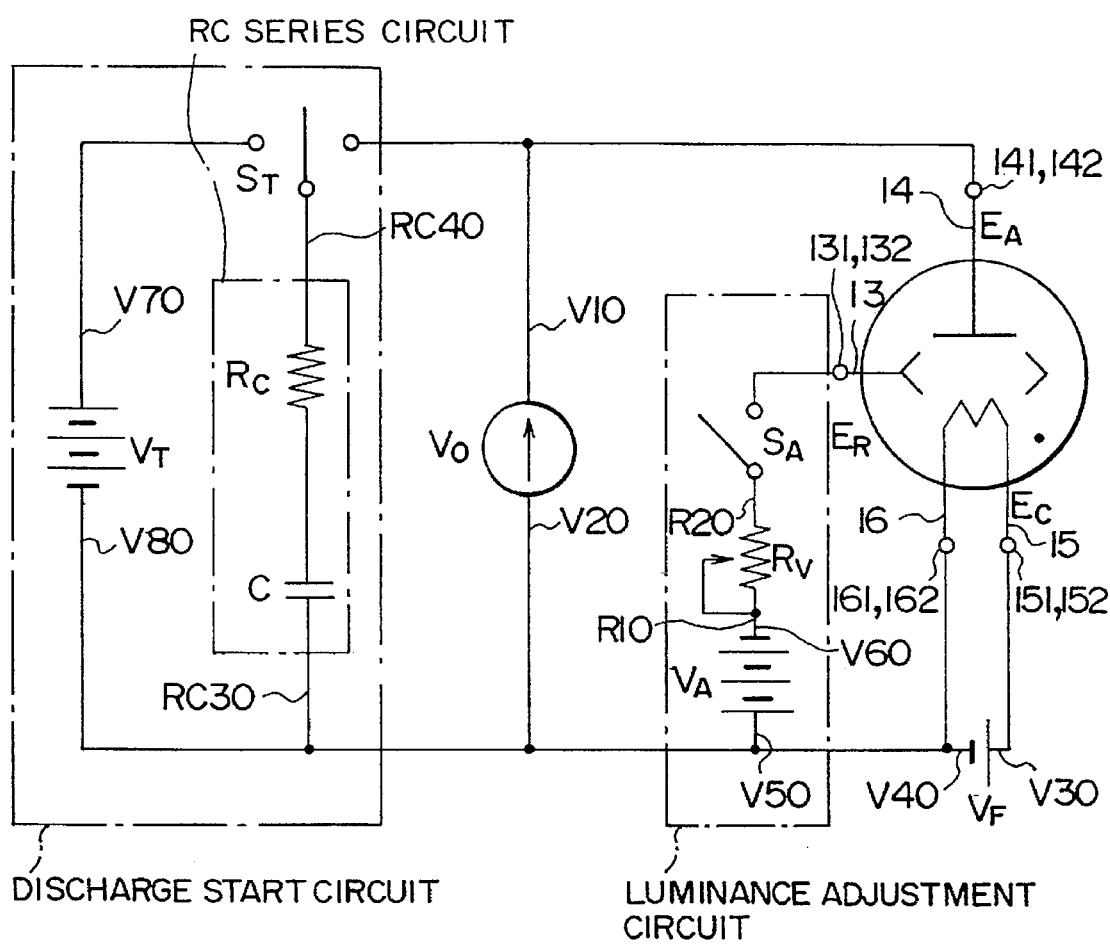
FIG. 12 is a circuit diagram showing the lighting device for the gas discharge tube in FIG. 1, as a third embodiment of the invention.

As shown in FIG. 12, this lighting device is not formed as a normal auxiliary electrode system. Between the anode ($E_A$) 24 and the hot cathode ($E_C$) 25, the discharge start circuit is formed of a discharge start voltage source $V_T$ and an RC series circuit. A first terminal V70 of the discharge start voltage source $V_T$ will be connected to the RC series circuit through the trigger switch $S_T$, and a second terminal V80 is connected to the first and the second cathode terminals 152 and 162. A first terminal RC30 of the RC series circuit will be connected to one of the discharge start voltage source $V_T$ and the anode terminal 142 through the trigger switch $S_T$. Therefore, the trigger switch $S_T$ functions to connect the second terminal RC40 of the RC series circuit one of the first terminal V70 and the anode terminal 142 at a predetermined timing. The discharge start voltage source $V_T$ supplies a DC open voltage of about 500 to 650 V. The luminance adjustment switch $S_A$ functions to connect the second terminal R20 of the luminance adjustment circuit to the focusing electrode terminal 132 at a predetermined timing.

According to this arrangement, first of all, the trigger switch $S_T$ is set in an ON state with respect to the discharge start circuit, and at the same time, the luminance adjustment switch $S_A$ is set in an OFF state. Thereafter, preparation for trigger discharge is made in the same manner as in the above embodiment. At this time, a voltage of 500 to 650 V is applied from the discharge start voltage source $V_T$ to the capacitor C through the fixed resistor $R_C$, and the capacitor C is sufficiently charged.

Subsequently, the trigger switch $S_T$ is set in an ON state with respect to the anode ($E_A$) 24, thereby supplying a potential of about 500 to 650 V to the anode ($E_A$) 24 by a high pulse voltage based on discharge of the capacitor C. With this operation, trigger discharge occurs between the hot cathode ($E_C$) 25 and the anode ($E_A$) 24 on the basis of a reduced impedance.

Although the discharge start voltage is about 350 at the start of lighting, the discharge start voltage increases according to continuation of lighting in some cases. For this reason, the trigger voltage to be applied between the anode ($E_A$) 24 and the hot cathode ($E_C$) 25 is set to about 500 to 650 V in consideration of the reliability.

After the trigger switch $S_T$ is set in an OFF state, generation of arc discharge and adjustment of the luminance are performed in the same manner as in the above embodiment.

Note that the present invention is not limited to the above embodiments, and various changes and modifications can also be made.

In the above embodiment as to the gas discharge tube, the light-emitting section is formed as a side-on type which extracts light from the side portion of the tube. However, with a head-on type light-emitting portion which extracts light from the head portion of the tube, the same effect as in the above embodiment can be obtained.

In the above embodiment, as the material of the discharge shielding member and the support member, a normal ceramic is used. On the other hand, when a so-called conductive ceramic such as beryllium oxide or aluminum nitride having a high thermal conductivity is used as the material of the discharge shielding member and the support member, a sink tank for the anode which is heated to a high temperature due to self heat generation is formed. For this reason, dissipation of the heat accumulated in the light-emitting section is promoted, and the operation of the gas discharge tube can be stabilized.

As has been described above in detail, in the gas discharge tube of the present invention, the focusing electrode is electrically insulated from the cathode slit electrode and the front electrode. With this structure, after the hot cathode is sufficiently heated, and a predetermined electric field is supplied to a space between the hot cathode and the anode, a positive potential higher than that of the front electrode and the cathode slit electrode will be supplied to the focusing electrode in generation of trigger discharge between the hot cathode and the focusing electrode. For this reason, the trigger discharge area extending from the cathode extends from a space surrounded by the front electrode and the cathode slit electrode, i.e., a space in the cathode box to reach the focusing electrode. Therefore, arc discharge will be easily generated between the hot cathode and the anode. Since this gas discharge tube will be certainly turned on, a gas discharge tube which improves the reproducibility of a satisfactory light emission state will be provided.

In addition, in the lighting device for the gas discharge tube of the present invention, the luminance adjustment circuit including the luminance adjustment voltage source, the variable resistor, and the luminance adjustment switch, all of which are sequentially connected in series, is arranged between the hot cathode and the focusing electrode. With this arrangement, when the luminance adjustment switch is set in an ON state with respect to the luminance adjustment circuit upon occurrence of arc discharge, a zero potential or a negative potential will be supplied from the luminance adjustment voltage source to the focusing electrode through the variable resistor. Since the focusing electrode repels electrons and attracts cations, an ion sheath is generated in a space in front of the focusing electrode. Therefore, the arc ball can be compressed or focused by this ion sheath. When the resistance value of the variable resistor is appropriately set, the luminance of the gas discharge tube will be increased. Therefore, a lighting device for a gas discharge tube, which highly increases the light emission intensity while maintaining stable discharge, will be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims. The basic Japanese Application No. 6-207714 (207714/1994) filed on Aug. 31, 1994 is hereby incorporated by reference.

What is claimed is:

1. A gas discharge tube comprising:

an envelope for sealing a gas therein;

lead pins introduced into an inner space of said envelope from external of said envelope; and a light-emitting section in said envelope, positioned at distal ends of said lead pins and supported by said lead pins while spaced from an inner side wall of said envelope, said light-emitting section including:

a hot cathode for emitting thermoelectrons;

an anode for receiving the thermoelectrons emitted from said hot cathode;

a focusing electrode having a focusing opening for converging paths of the thermoelectrons and for passing through the thermoelectrons which are emitted from said hot cathode and which are received by said anode; and a cathode box surrounding said hot cathode, for partially shielding discharge of said hot cathode, said cathode box having a cathode slit electrode located between said hot cathode and said focusing electrode, said cathode slit electrode having a slit for passing through the thermoelectrons emitted from said hot cathode, and a front electrode facing to said focusing electrode so as to accommodate said hot cathode and said cathode slit electrode in a space defined by said front electrode and said focusing electrode, said front electrode having a window located at a position which faces to the focusing opening of said focusing electrode, for outputting light caused by discharge, wherein said cathode slit electrode and said front electrode are insulated from said focusing electrode.

2. A gas discharge tube, comprising:

an envelope for sealing a gas therein;

lead pins introduced into an inner space of said envelope from external of said envelope; and a light-emitting section in said envelope, positioned at distal ends of said lead pins and supported by said lead pins while spaced from an inner side wall of said envelope, said light-emitting section including:

a hot cathode for emitting thermoelectrons;

an anode for receiving the thermoelectrons emitted from said hot cathode;

a focusing electrode having a focusing opening for converging paths of the thermoelectrons and for passing through the thermoelectrons which are emitted from said hot cathode and which is received by said anode;

a discharge shielding member made of an insulator positioned between said focusing electrode and said anode, and having a front surface and a rear surface which is opposite to the front surface; and a cathode box surrounding said hot cathode, for partially shielding discharge of said hot cathode, said cathode box having a cathode slit electrode located between said hot cathode and said focusing electrode, said cathode slit electrode having a slit for passing through the thermoelectrons emitted from said hot cathode, and a front electrode facing to said focusing electrode so as to accommodate said hot cathode and said cathode slit electrode in a space defined by said front electrode and said focusing electrode, said front electrode having a window located at a position which faces the focusing opening of said focusing electrode, for outputting light caused by discharge between said hot cathode and anode, wherein said focusing electrode is mounted on and supported by the front surface of said discharge shielding member, and wherein said cathode slit electrode and said front electrode of said cathode box are respectively mounted on and supported by the front surface of said discharge shielding member while spaced and insulated from said focusing electrode.

3. A gas discharge tube according to claim 2, wherein said cathode slit electrode and said front electrode of said cathode box are in direct contact with each other so as to have a same potential.

4. A gas discharge tube according to claim 2, wherein said focusing electrode is mounted on and in contact with the front surface of said discharge shielding member, and said anode is mounted on and in contact with the rear surface of said discharge shielding member.

5. A gas discharge tube according to claim 4, wherein said light-emitting section further comprises a support member made of an insulator being in said envelope and located on an opposite side to said discharge shielding member through said anode, said support member having a projection for pushing said anode onto the rear surface of said discharge shielding member.

6. A gas discharge tube according to claim 5, wherein said support member further has a depression at a surface which faces to said anode, for providing a heat dissipation space for said anode.

7. A gas discharge tube according to claim 5, wherein said discharge shielding member and said support member are formed of a ceramic.

8. A gas discharge tube according to claim 4, wherein said discharge shielding member has a recessed portion at the rear surface of said discharge shielding member, for accommodating said anode.

9. A gas discharge tube according to claim 4, wherein said discharge shielding member is disposed in the inner space of said envelope while being supported by lead pins penetrating said envelope.

10. A gas discharge tube according to claim 9, wherein said discharge shielding member is spaced from an inner side wall of said envelope through a space containing the gas.

11. A gas discharge tube according to claim 9, wherein the recessed portion of said discharge shielding member has a depth matching a sum of a height of said projection of said support member and a thickness of said anode, whereby a front surface of said support member is in partial contact with the rear surface of said discharge shielding member.

12. A gas discharge tube according to claim 2, wherein said anode is a metal plate mounted on and supported by a distal end of a lead pin penetrating said envelope.

13. A lighting device for a gas discharge tube having at least an envelope for sealing a gas therein, lead pins introduced into an inner space of said envelope from external of said envelope, and a light-emitting section in said envelope, positioned at distal ends of said lead pins and supported by said lead pins while spaced from an inner side wall of said envelope, said light-emitting section including a hot cathode for emitting thermoelectrons, an anode for receiving the thermoelectrons, a focusing electrode for converging paths of the thermoelectrons, and a window for outputting light caused by discharge between said hot cathode and said anode, said lighting device comprising:

an anode terminal adapted to be electrically connected to the anode of the gas discharge tube;

a focusing electrode terminal adapted to be electrically connected to the focusing electrode of the gas discharge tube;

a first and a second cathode terminals adapted to be electrically connected to both ends of the hot cathode of the gas discharge tube;

an electric field generating voltage source for generating an electric field from the anode to the hot cathode of the gas discharge tube, disposed between said anode terminal and said first and second cathode terminals, having a first terminal being connected to said anode terminal and a second terminal being connected to said first and second cathode terminals; and a luminance adjustment circuit for adjusting a potential to be supplied to the focusing electrode of the gas discharge tube, disposed between said focusing electrode terminal and said first and second cathode terminals, said luminance including:
- a luminance adjustment voltage source having a first terminal being connected to said first and second cathode terminals and a second terminal;
- a variable resistor having a first terminal being connected to said second terminal of said luminance adjustment voltage source and a second terminal to be connected to said focusing electrode terminal through a luminance adjustment switch.

14. A lighting device according to claim 13, further comprising a cathode heating voltage source for heating the hot cathode, disposed between said first and second cathode terminals, having a first terminal being connected to said first cathode terminal and a second terminal being connected to the second cathode terminal.

15. A lighting device according to claim 13, further comprising a discharge start circuit including:

an RC parallel circuit constituted by a capacitor and a fixed resistor arranged in parallel, having a first terminal to be connected to said focusing electrode terminal through said luminance adjustment switch and a second terminal to be connected to said anode terminal through a trigger switch.

16. A lighting device according to claim 13, further comprising a discharge start circuit including:
- a fixed resistor having a first terminal being connected to said anode terminal; and
- a capacitor having a first terminal being connected to said first and second cathode terminals and a second terminal to be connected to one of a second terminal of said variable resistor and said focusing electrode terminal through a trigger switch and said luminance adjustment switch.

17. A lighting device according to claim 13, further comprising a discharge start circuit including:
- a discharge start voltage source for generating an electric field from said anode to said hot cathode, having a first terminal being connected to said first and second cathode terminals; and
- an RC series circuit constituted by a fixed resistor and a capacitor arranged in series, having a capacitor side terminal being connected to said first and second cathode terminals and a capacitor side terminal to be connected to one of said anode terminal and a second terminal of said discharge start voltage source through a trigger switch.

18. A method of operating a lighting device for a gas discharge tube having at least an envelope for sealing a gas therein, lead pins introduced into an inner space of said envelope from external of said envelope, and a light-emitting section in said envelope, positioned at distal ends of said lead pins and supported by said lead pins while spaced from an inner side wall of said envelope, said light-emitting section including a hot cathode for emitting thermoelectrons, an anode for receiving the thermoelectrons, a focusing electrode for converging paths for the thermoelectrons, and a window for outputting light caused by discharge between said hot cathode and said anode, said method comprising:
- a first step of heating the hot cathode by supplying a predetermined voltage to ends of the hot cathode;
- a second step of supplying a predetermined voltage between the heated hot cathode and the anode after the first step so as to generate an electric field from the anode to the heated hot cathode;
- a third step of supplying a predetermined voltage sufficient to generate discharge between the hot cathode and one of the focusing electrode and the anode, to one of the focusing electrode and the anode after the second step; and
- a fourth step of adjusting a potential of the focusing electrode by supplying a predetermined voltage so that a potential of the focusing electrode is lower than or equal to that of the focusing electrode in the second step after the third step.

19. A method according to claim 18, wherein the potential of the focusing electrode in the fourth step is set at a zero potential or a negative potential.

* * * * *